Patented Oct. 2, 1945

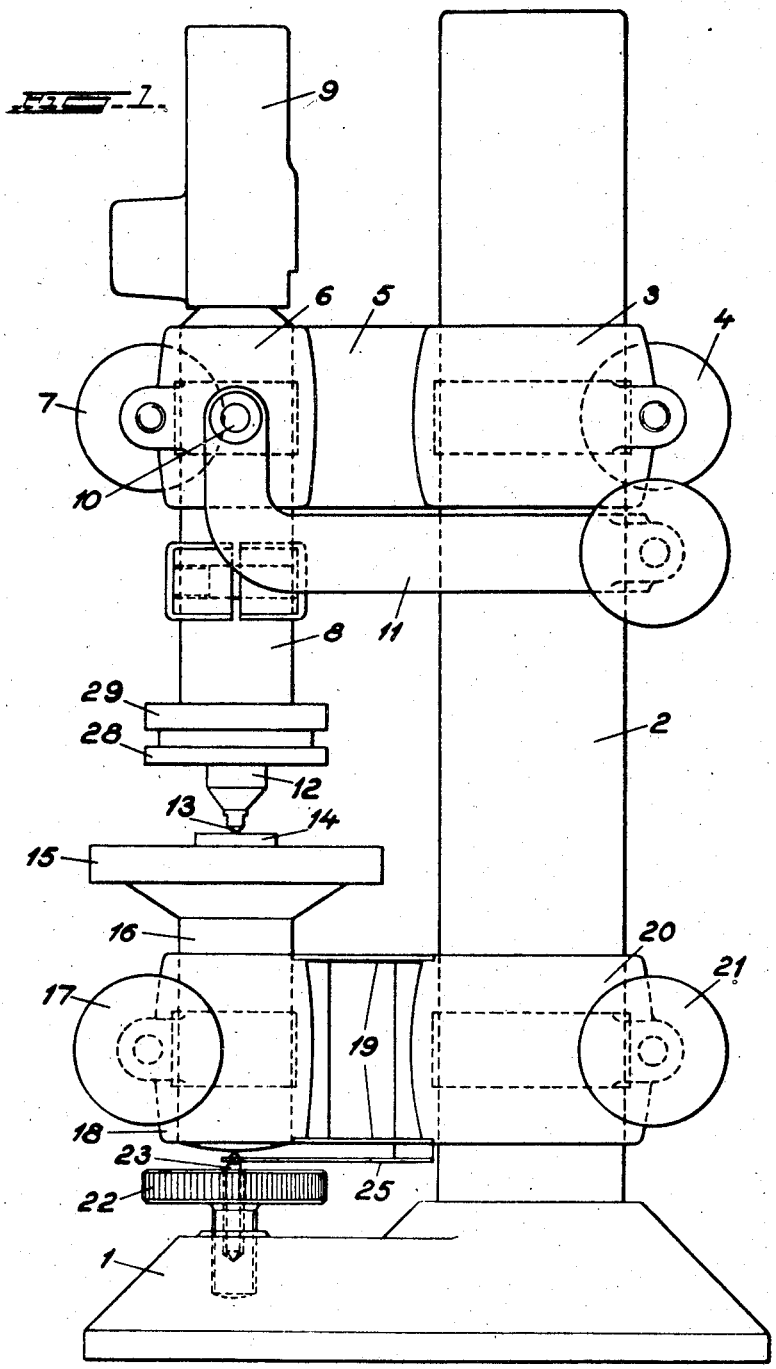

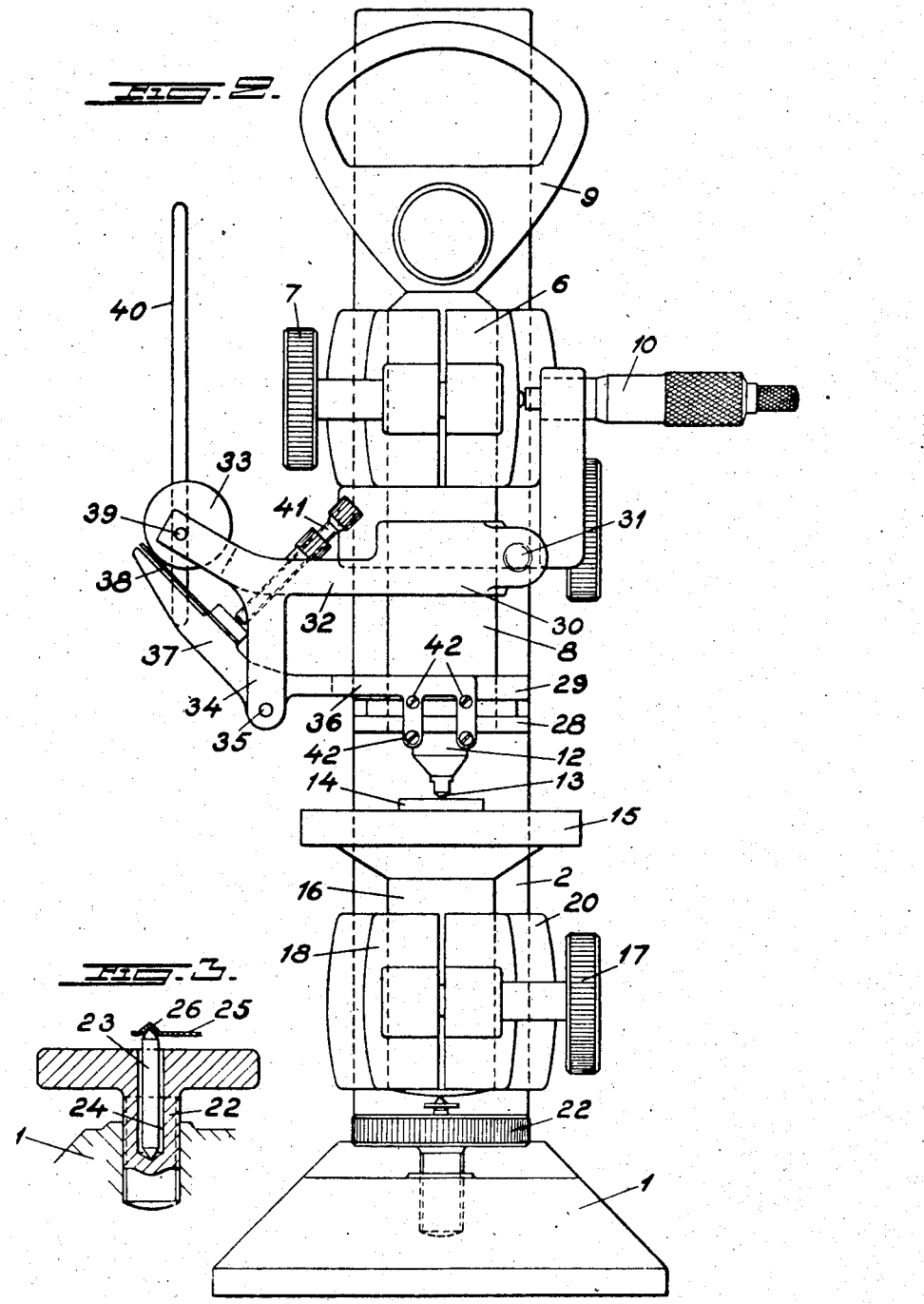

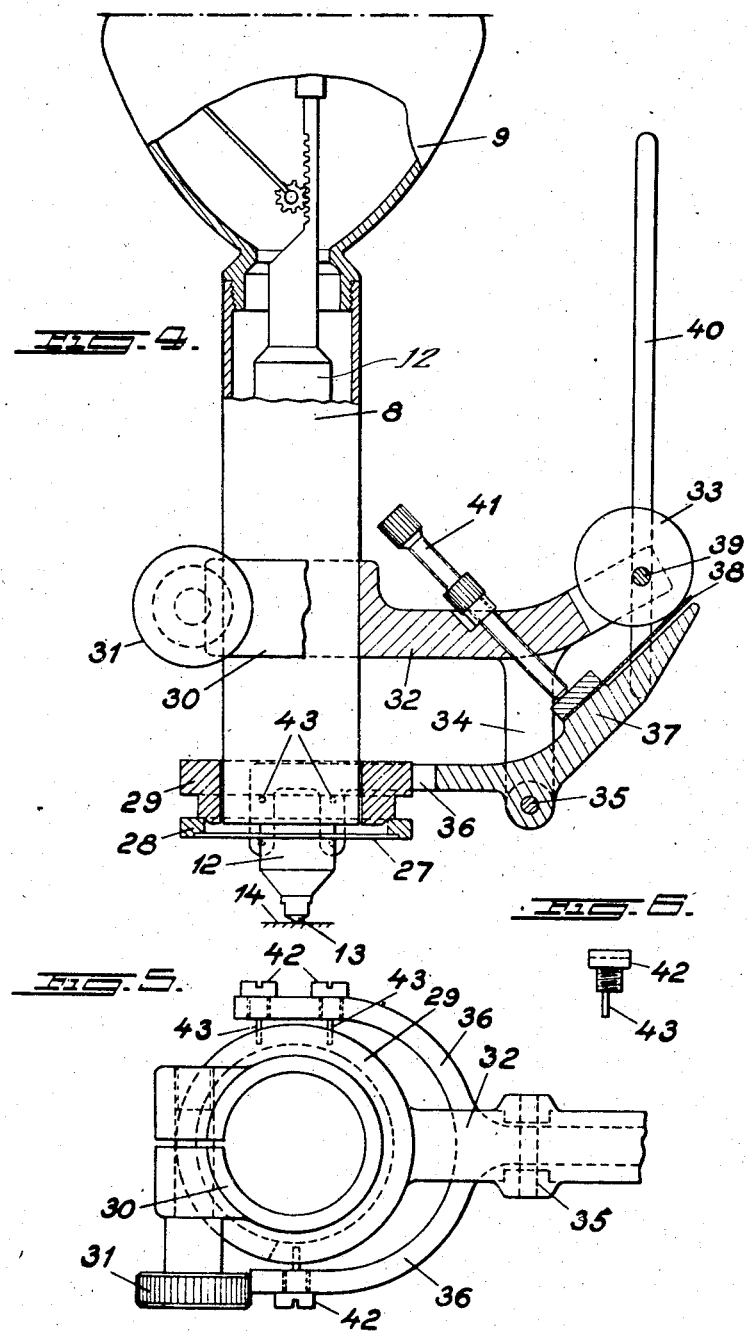

2,385,958

UNITED STATES PATENT OFFICE 2,385,958

HARDNESS MEASURING APPARATUS

Ragnar Woxén, Lidingo, Sweden, assignor to Aktiebolaget C. E. Johansson, Eskilstuna, Sweden, a company of Sweden Application September 15, 1943, Serial No. 502,467
In Sweden October 7, 1942

5 Claims. (Cl. 73—83)

The present invention relates to an improvement in hardness measuring apparatus which consists of a measuring instrument, for instance a micro-indicator, to which a point is connected which is adapted to be pressed into the surface of the body the hardness of which is to be measured, by the aid of a weight or weights applied to the point or to a member connected to the point, and of a table on which the said body may be placed for performing the measuring operation, and which is adapted to be raised towards the said point. It is an object of the present invention to provide a measuring apparatus of this type which may be used advantageously for hardness measurement of, for instance, nitrogen-hardened, chromium-plated or cyanide-treated surfaces and of thin foils in which hardness testing apparatus of the ordinary type would cause too large indentations. For the purpose of the present invention the loading weights used should be considerably smaller than those hitherto used, so that they only produce very small indentations which are observed and measured by means of a microscope. In order to render it possible to use these small indentations for effecting a reliable determination of the hardness, it is necessary that the indentations do not become deformed owing to movements of the table and of the point relatively to one another in the lateral direction. The table must not perform lateral movements when it is raised with the body to be tested placed thereon towards the point, since such lateral movements, even though very small, would cause deformations of the indentations in the bodies to be tested, and furthermore, the application and the removal of the load weights must be performed in such manner that they do not exert a pressure on the point in any oblique direction.

It is the object of the present invention to provide a hardness measuring apparatus which meets these two requirements. With this purpose in view the invention consists principally in the table being supported and guided by two broad parallel flat springs which are attached to the frame of the apparatus, the table being adapted to be raised towards the point by means of a rod the upper end of which engages the lower side of the table, and which is freely movable in the lateral direction within certain limits in a bore in an adjustment screw which is adjustable in the vertical direction in the frame. Owing to this arrangement all lateral movements of the table are obviated during those slight upward movements that occur while the measurements are performed. In order to prevent the load weights from causing lateral movements of the point when said weights are applied to the latter, the point may suitably be provided with a round plate or the like which is arranged coaxially to the point and is adapted to receive the load weights which are made in the shape of rings, and furthermore, for applying these ring-shaped weights to the plate and for removing the weights from the latter a double-armed lever is used which is pivoted in the frame to one side of the point, one arm of said lever being fork-shaped and provided with adjustment screws for supporting the rings, and the other arm of said lever being adapted to be actuated by an eccentric or the like through the intermediary of a spring for turning the lever. By means of this arrangement it is possible to apply each load ring in such manner that the various points of its lower side are simultaneously engaged by the plate, or by a ring previously placed on the plate, respectively.

A constructional form of an apparatus according to the present invention is illustrated by way of example in the accompanying drawings. Fig. 1 shows a hardness measuring apparatus according to the invention, viewed from one side, and Fig. 2 shows a front view of the same apparatus, as viewed from the left in Fig. 1. Fig. 3 shows a section through the means for raising the table. Fig. 4 shows, partly in vertical section, the means for applying and removing the weights, and Fig. 5 shows the same means viewed from above. Fig. 6 shows one of the adjustment screws which are used in the lever arm.

In the constructional form illustrated, 1 denotes a frame base plate on which a standard 2 is provided which supports a slotted bracket 3 which is slidable as well as capable of turning on the standard 2 and may be locked in the desired position on the latter by means of a clamp screw 4. Secured to the bracket 3 are two flat springs 5 placed vertically, which support a slotted cross-piece 6 having a clamp screw 7 in which the shaft 8 of the micro-indicator 9 is secured. Bearing against one side of the cross-piece 6 is the screw of a micrometer 10 which is supported by an arm 11 which may be secured to the standard 2, said micrometer serving to adjust the cross-piece 6 and thus the micro-indicator 9 in the lateral direction, as viewed in Fig. 2. The measuring pin 12 of the micro-indicator is movable up and down in the hollow shaft 8 and supports the point 13 at its lower end projecting from the shaft. The point 13 which may be conical or shaped as a pyramid and is made of hard steel, is intended to be pressed into the surface of the body 14 the hardness of which is to be measured. For this purpose the body 14 is placed on a table 15 which is provided with a central leg or stem 16 which is locked in a slotted sleeve 18 by means of a clamp screw 17. Said sleeve and thus also the table 15 is supported by two broad and parallel flat springs 19, which are shown in edge view in Fig. 1, and which are attached to a slotted bracket 20 which is slidable as well as capable of turning on the standard 2 and may be locked in the desired position on the latter by means of a clamp screw 21.

For the purpose of raising the table 15 and the body 14 placed thereon towards the point 13, an adjustment screw 22 is screw-threaded into the base plate 1 right below the table. Said screw does not act directly upon the leg or stem 16, however, because in such case it might happen that the turning of the screw would cause the table to make a slight movement in the lateral direction, and such movement might deform the microscopic indentation caused by the point 13 in the body 14. Instead, the screw actuates the stem of the table through the intermediary of a small rod 23 which is pointed at both ends and which is supported in a central bore 24 in the adjustment screw 22 so that it is free from the walls of said bore, as shown in Fig. 3. The upper end of the rod is guided in the lateral direction by a small flat spring 25 one end of which is attached to the bracket 20, and the free end of which is provided with a punch mark 26 which is engaged by the upper pointed end of the rod 23. The punch mark in the spring bears, in its turn, against the lower end of the table stem 16, as shown in Figs. 1 and 2. This arrangement renders it possible by rotation of the adjustment screw 22 to raise the table 15 the required distance without causing it to move in the lateral direction.

In order to render it possible to load the point 13 with the desired weights, a round plate 27, Fig. 4, is attached to the lower portion of the measuring pin 12 projecting from the shaft 8, in such manner that the center of said plate lies on the axis of the point 13 and measuring pin 12. The said plate serves to receive the ring-shaped loading weights, two of which, namely a smaller ring 28, the initial load or pre-load, and a larger ring 29, the additional load, are shown in the drawings. For applying these weights to and removing them from the plate 27 there is provided on the shaft 8 a clamp sleeve 30, Figs. 2 and 4, which may be locked to said shaft by means of a clamp screw 31, and which is provided with a projecting arm or bracket 32 in which an eccentric 33 is journalled, and which has two depending arms 34 in which a double-armed lever 36, 37 is journalled on a pin 35. One arm of said lever is formed as a fork 36, Fig. 5, while to the other arm 37 a flat spring 38 is secured which is adapted to be actuated by the eccentric 33. The latter is pivoted on the pin 39 and may be turned by means of a lever 40. The lever 36, 37 may also be turned by means of a screw 41 which is screw-threaded into the bracket 32 and actuates the lever arm 37. Screwed into the shanks of the fork 36 are adjustment screws 42, namely, two such screws in one of the shanks, and one screw in the other shank, for each of the weights 28 and 29, in the manner illustrated in Figs. 2 and 5. These screws are provided with pins 43 which reach below the rings 28 and 29 for supporting said rings when they are to be raised from the plate 27 or lowered onto the same. It should be noted that the pins 43 on at least two of the three screws 42 which support each ring, are arranged eccentrically with relation to the axis of the screw, as shown in Fig. 6, so that by turning these screws it is possible to adjust the ring in such position that its lower side occupies a perfectly horizontal position when it is lowered onto the plate 27, or onto the lower ring 28, so that the entire surface of said lower side of the ring is simultaneously engaged by said plate or lower ring. In this way the load weights are prevented from exerting an oblique force on the point 43 when applied to the same.

The measuring operation is carried out in the following manner: The face of the body 14 the hardness of which is to be tested, should be parallel to the surface of the table 15. The most uniform values will be obtained if the surface of the body to be tested is polished. The lower surface of the body should be ground plane, and the body is preferably clamped to the table 15 by means of springs, not shown in the drawings. Before performing the measurement, care should be taken that the lever 40 is directed downwards, in which case the eccentric 33 holds the lever 37, 36 in such position that both weights 28 and 29 rest on the pins 43 and are thus raised from the plate 27. The pre-loading weight 28 is first placed on the plate 27 by raising the table 15 with the body 14 thereon by turning the adjustment screw 22. When the body engages the point 13, the latter is raised and thus also the plate 27 so that the latter lifts the weight 28 from the corresponding pins 43 in the fork 36. In this way the table is cautiously raised until the pointer of the micro-indicator 9 points to zero. The pre-loading weight 28 is thus applied, and it is allowed to act during a short time, for instance 10 seconds, after which the exact position of the pointer is read off and recorded. The additional load 29 is then applied by slowly turning the lever 40 upwards to the position shown in Figs. 2 and 4. Owing to such turning of said lever 40, which should be effected in 5 to 10 seconds, the fork 36 is lowered so that the weight 29 is placed on the weight 28 and will thus act on the point 13 which is thus pressed deeper into the body 14. The weight 28 is now allowed to act during a short time, for instance 30 seconds, after which it is again raised by the lever 30 being slowly turned upwards. Finally, the position of the pointer is again read off. The difference between the readings constitutes the difference of indentations with the aid of which the hardness number sought of the tested body is obtained from diagrams or tables corresponding to the loading weights used.

The constructional form above described and illustrated in the drawings is only to be regarded as an example, and it will be understood that it may be modified in several ways as regards its details without departing from the principle of the invention.

I claim:

1. A hardness measuring apparatus, comprising in combination a frame, a measuring instrument supported in said frame, a penetrator connected to said measuring instrument and serving to be pressed into the surface of a body the hardness of which is to be measured, a member connected to said penetrator and serving to support weights for loading said penetrator, a table serving to support the body the hardness of which is to be measured, two spaced parallel flat springs supporting and guiding said table and attached to said frame in such manner that by deflection of said springs said table may be moved towards and away from said penetrator, an adjustment screw screw-threaded in said frame and adjustable in the direction of movement of said table towards and away from said penetrator, and a rod interposed between said adjustment screw and said table.

2. A hardness measuring apparatus, comprising in combination a frame, a measuring instrument supported in said frame, a penetrator connected to said measuring instrument and serving to be pressed into the surface of a body the hardness of which is to be measured, a member connected to said penetrator and serving to support weights for loading said penetrator, a table serving to support the body the hardness of which is to be measured, two spaced parallel flat springs supporting and guiding said table and attached to said frame in such manner that by deflection of said springs said table may be moved towards and away from said penetrator, an adjustment screw screw-threaded in said frame and adjustable in the direction of movement of said table towards and away from said penetrator, said adjustment screw having a bore, and a rod interposed between said adjustment screw and said table, one end of said rod being supported in said bore in said adjustment screw.

3. A hardness measuring apparatus, comprising in combination a frame, a measuring instrument supported in said frame, a penetrator connected to said measuring instrument and serving to be pressed into the surface of a body the hardness of which is to be measured, a member connected to said penetrator and serving to support weights for loading said penetrator, a table serving to support the body the hardness of which is to be measured, two spaced parallel flat springs supporting and guiding said table and attached to said frame in such manner that by deflection of said springs said table may be moved towards and away from said penetrator, an adjustment screw screw-threaded in said frame and adjustable in the direction of movement of said table towards and away from said penetrator, a rod interposed between said adjustment screw and said table, and a spring attached to said frame and cooperating with said rod to guide the same laterally upon adjustment of said adjustment screw.

4. A hardness measuring apparatus, comprising in combination a frame, a measuring instrument supported in said frame, a penetrator connected to said measuring instrument and serving to be pressed into the surface of a body the hardness of which is to be measured, a round plate connected to said penetrator coaxially with the same and serving to support weights for loading said penetrator, a table serving to support the body the hardness of which is to be measured, two spaced parallel flat springs supporting and guiding said table and attached to said frame in such manner that by deflection of said springs said table may be moved towards and away from said penetrator, an adjustment screw screw-threaded in said frame and adjustable in the direction of movement of said table towards and away from said penetrator, and a rod interposed between said adjustment screw and said table.

5. A hardness measuring apparatus, comprising in combination a frame, a measuring instrument supported in said frame, a penetrator connected to said measuring instrument and serving to be pressed into the surface of a body the hardness of which is to be measured, a round plate connected to said penetrator coaxially with the same and serving to support weights for loading said penetrator, a table serving to support the body the hardness of which is to be measured, two spaced parallel flat springs supporting and guiding said table and attached to said frame in such manner that by deflection of said springs said table may be moved towards and away from said penetrator, an adjustment screw screw-threaded in said frame and adjustable in the direction of movement of said table towards and away from said penetrator, a rod interposed between said adjustment screw and said table, and a spring attached to said frame and cooperating with said rod to guide the same laterally upon adjustment of said adjustment screw.

RAGNAR WOXÉN.